(12) United States Patent
Rosenwach

(10) Patent No.: US 9,366,480 B2
(45) Date of Patent: Jun. 14, 2016

(54) COOLING TOWER WITH GEODESIC SHELL

(71) Applicant: Andrew Rosenwach, Long Island City, NY (US)

(72) Inventor: Andrew Rosenwach, Long Island City, NY (US)

(73) Assignee: ROSENWACH TANK CO., LLC, Long Island City, NY (US)

( * ) Notice: Subject to any disclaimer, the term of this patent is extended or adjusted under 35 U.S.C. 154(b) by 261 days.

(21) Appl. No.: 14/249,604

(22) Filed: Apr. 10, 2014

(65) Prior Publication Data

US 2015/0176908 A1 Jun. 25, 2015

Related U.S. Application Data

(60) Provisional application No. 61/920,598, filed on Dec. 24, 2013.

(51) Int. Cl.
| | | |
|---|---|---|
| *E04H 5/12* | (2006.01) | |
| *F28C 1/00* | (2006.01) | |
| *F28F 25/02* | (2006.01) | |
| *F28F 25/10* | (2006.01) | |

(52) U.S. Cl.
CPC .. *F28C 1/00* (2013.01); *E04H 5/12* (2013.01); *F28F 25/02* (2013.01); *F28F 25/10* (2013.01)

(58) Field of Classification Search
CPC .............. E04H 5/12; F28C 1/00; F28F 25/02; F28F 25/10
USPC ......... 261/108, 109, 112.1, DIG. 11; 52/81.2, 52/81.4
See application file for complete search history.

(56) References Cited

U.S. PATENT DOCUMENTS

| | | | | |
|---|---|---|---|---|
| 2,711,181 A * | 6/1955 | Woods | ............... | E04B 1/3441 135/136 |
| 2,809,818 A * | 10/1957 | Munters | ............... | B01D 50/00 159/4.04 |
| 3,422,883 A * | 1/1969 | Daltry | ............... | E04H 5/12 165/47 |
| 3,439,460 A * | 4/1969 | Allen | ............... | E04B 1/3211 52/81.4 |
| 3,708,155 A * | 1/1973 | Holmberg | ............... | F04D 29/388 261/109 |
| 3,743,257 A * | 7/1973 | Fordyce | ............... | F28C 1/04 165/900 |
| 4,388,785 A * | 6/1983 | Queffelec | ............... | E04H 5/12 52/222 |
| 4,646,504 A * | 3/1987 | Britvec | ............... | E04B 1/1906 52/655.2 |
| 5,072,553 A * | 12/1991 | Bozetto | ............... | E04H 5/12 261/DIG. 11 |
| 5,112,371 A * | 5/1992 | Tippmann | ............... | F28C 1/04 261/111 |
| 5,170,598 A * | 12/1992 | Kadar | ............... | E04B 1/165 261/DIG. 11 |
| 6,250,610 B1 * | 6/2001 | Flaherty | ............... | F28C 1/00 261/109 |
| 7,484,718 B2 * | 2/2009 | Facius | ............... | F28C 1/14 261/153 |

* cited by examiner

*Primary Examiner* — Charles Bushey
(74) *Attorney, Agent, or Firm* — Ostrolenk Faber LLP

(57) ABSTRACT

A cooling tower with a self-supported shell, and a cooling apparatus residing inside the shell. The shell includes a base section, a cap section and an annular wall residing between the base section and the cap section, the annular wall including a plurality of geometric bodies that are joined to one another and giving the shell a geodesic configuration.

18 Claims, 11 Drawing Sheets

COOLING TOWER WITH GEODESIC SHELL

CROSS REFERENCE TO RELATED APPLICATIONS

The present application claims priority to U.S. Provisional Patent Application No. 61/920,598, filed Dec. 24, 2013, the entire contents of which are incorporated in full herein by reference.

FIELD OF THE INVENTION

The present invention relates to a cooling tower for a building and in particular to a cooling tower having an exterior shell constructed based on geodesic construction principles.

BACKGROUND

A conventional cooling tower includes a cooling apparatus enclosed within a shell.

In a closed circuit cooling tower the cooling apparatus includes a cooling coil.

In a closed circuit cooling tower, the condenser water is pumped through a coil and water from an outside source is distributed over the coil to cool the water inside the coil.

In an open draft (induced draft) cooling tower the cooling tower does not include a coil.

In an open draft cooling tower, the water from the condenser is conducted straight up to the tower and is cooled by the air and the water distribution system of the cooling apparatus. The cooled water then returns to the condenser.

Specifically, in an induced draft cooling tower, a fan residing in the shell of the tower generates an air flow inside the shell to induce an airflow into the shell of the tower through passages defined in the sidewalls of the shell. A fluid, usually water, is pumped to the top of the cooling tower and distributed inside the shell typically through spray nozzles across the top of a fill media (fill cells). Fill cells are typically a bundle of spaced parallel plastic sheets supported inside the shell. Water is dispersed and downwardly passed by gravity over the fill cells. The large surface area of the fill cells, across which the water is dispersed, leads to the cooling of the water by the induced air flow between the fill cells. The cooled water is collected in a sump (pool) at the bottom of the shell and then returned to the cooling system of a facility, e.g. a building.

A heat exchanger may be provided beneath the fill cells. The heat exchanger may include coils. A fluid that is to be cooled is supplied to the coil at one end, and once cooled, the fluid exits at another end. Alternately, vapor could be supplied to the coil, condensed, and then collected. U.S. Pat. No. 7,484,718 is an example of a system as described and is incorporated herein by reference.

Cooling towers are usually deployed on building roofs. Thus, the weight of the tower is an important factor to consider when installing a cooling tower. Furthermore, since a typical rooftop has a limited area for a cooling tower, the footprint of a cooling tower is a factor to consider.

The known shell structures include cubical shells, cylindrical shells, and dome (semispherical) shells.

A cubical shell requires an inner frame for supporting the rectangular panels that form the cubical structure. Thus, cubical shells are heavy relative to their footprint. Furthermore, cubical shells have corners that tend to trap heated air and reduce the efficiency of the cooling tower.

A semispherical shell (e.g. a dome) occupies a large footprint relative to its height. For example, a hemisphere would have a circular base with a diameter that is twice its height (i.e. its radius). Thus, to increase the height of a cooling tower that has a semispherical shell, its footprint would have to be increased as well.

A cylindrical shell would also require an internal framework to support its flat top, which, like a cubical shell, would increase its weight relative to its footprint.

Different materials are known for the construction of shells including metals and plastic.

SUMMARY OF THE INVENTION

An object of the present invention is a cooling tower that may be more efficient than conventional cooling towers.

Another object of the present invention is a cooling tower with a shell with better structural characteristics (weight and footprint) than the shells of conventional cooling towers.

A cooling tower according to the present invention includes an exterior shell that is constructed based on geodesic principles used for construction of, for example, geodesic domes.

A cooling tower according to the present invention includes a shell, and a cooling apparatus residing within the shell. In its preferred form, a cooling tower according to the present invention is an open draft cooling tower, although other types of cooling towers could be devised based on the invention.

A cooling tower according to the present invention includes a shell having a base section, a cap section, and an annular wall extending above the base section and below the cap section to support the cap section. Together, the base section, the annular wall, and the cap section define an interior space in which the cooling apparatus is accommodated.

The annular wall includes a plurality of geometric planar panels joined to one another to define a structure in which the geometric planar panels are oriented at an angle that is more than zero relative to a vertical plane when the central axis of the annular wall is vertical. The geometric panels may be triangular panels of a uniform thickness as used in geodesic dome structures. The cap section may be shaped like a dome and includes an air passage having a center that coincides with a central axis of the cap section, which is preferably coincident with the central axis of the annular wall as well. The cap section may be a geodesic dome or another type of dome.

Preferably, the cooling apparatus includes a blocked fan or impeller arranged below the air passage and operated by a motor to expel heated, humid air from the interior space of the shell. The motor may be supported by a frame residing within the interior space. The cooling apparatus may further include a network of pipes, including an inlet pipe, a riser connected to the inlet pipe, a plurality of primary distribution pipes connected to the riser at a location spaced from the inlet pipe, and a plurality of secondary distribution pipes, each distribution pipe being arranged around the frame and configured to deliver water to the interior space of the shell.

The secondary distribution pipes may be arcuate and arranged along the path of two concentric circles. The secondary distribution pipes may be arranged so that a pair of secondary distribution pipes is connected to one primary distribution pipe.

The cooling apparatus further comprises a plurality of fill cells positioned to receive water from the secondary distribution pipes.

The shell may have defined therein air intake openings at positions in the shell that are below the secondary distribution pipes inside the shell. The air intake openings may be defined in the base section. The base section may include an annular enclosure and a bottom wall that defines a water-tight reservoir positioned below the fill cells to receive the cooling water, which may pass over the cooling devices (heat exchangers such as coils), if provided.

According to the present invention, each triangular panel in the annular wall of the shell includes two sides connected at an apex point and a base, which, as used herein, means the side that extends between the ends of the two sides opposite the apex point.

The annular wall of the shell may include two annular portions one above the other, that are joined to one another. Each annular portion includes a plurality of adjacent triangular panels arranged side by side so that the apex of each panel is adjacent the bases of two adjacently positioned panels.

Each side in each triangular panel is joined with a respective side of an adjacently disposed triangular panel, and each base of each triangular panel in each annular portion is joined with one of the base section, the cap section, and a base of another triangular panel in the other annular portion.

The annular portions of the annular wall may be symmetric. The annular portions may be joined at a plane of symmetry residing between the two annular portions.

In the first embodiment, the shell includes one annular wall.

In the second embodiment, the shell includes a stack of a plurality of annular walls, the stack residing between the cap section and the base section of the shell.

A shell according to the present invention would not require an internal frame to support the panels, and may be at least 70% stronger than a cubical shell of the same height and footprint, which means it can be made lighter while handling the same volume of air as, for example, a cubical cooling water shell.

The geodesic appearance of a shell according to the present invention may be appealing, which is a benefit because the cooling tower would be visible on a roof from many vantage points.

A cooling tower with a shell according to the present invention may be more thermally efficient compared to a cooling tower with a cubical shell that processes a similar volume of water. This means that a tower according to the present invention may produce better Tonnage (BTU/hr) with the same or less GPM. In a system according to the present invention, the water supplied into the tower via an inlet pipe may be cooled in the basin pool since the inlet pipe resides in the basin pool before reaching the riser. Thus, the inlet water may be cooled (e.g. by about 5 degrees) and thereafter it may be further cooled as it is sprayed over the fill cells (e.g. by another 9 degrees).

The internal configuration of a shell according to the present invention may induce thermal condensation. The dome shape design may prevent water from escaping and may cause water to condense on its walls. The condensed water may be then returned to the basin pool. In a cubical tower, the fan only draws air in a vertical column toward the area covered by the fan and is believed by the inventor hereof to lose about 30% of the water without causing condensation.

Other features and advantages of the present invention will become apparent from the following description of the invention which refers to the accompanying drawings.

DETAILED DESCRIPTION OF EMBODIMENTS OF THE INVENTION

Figure 1A:
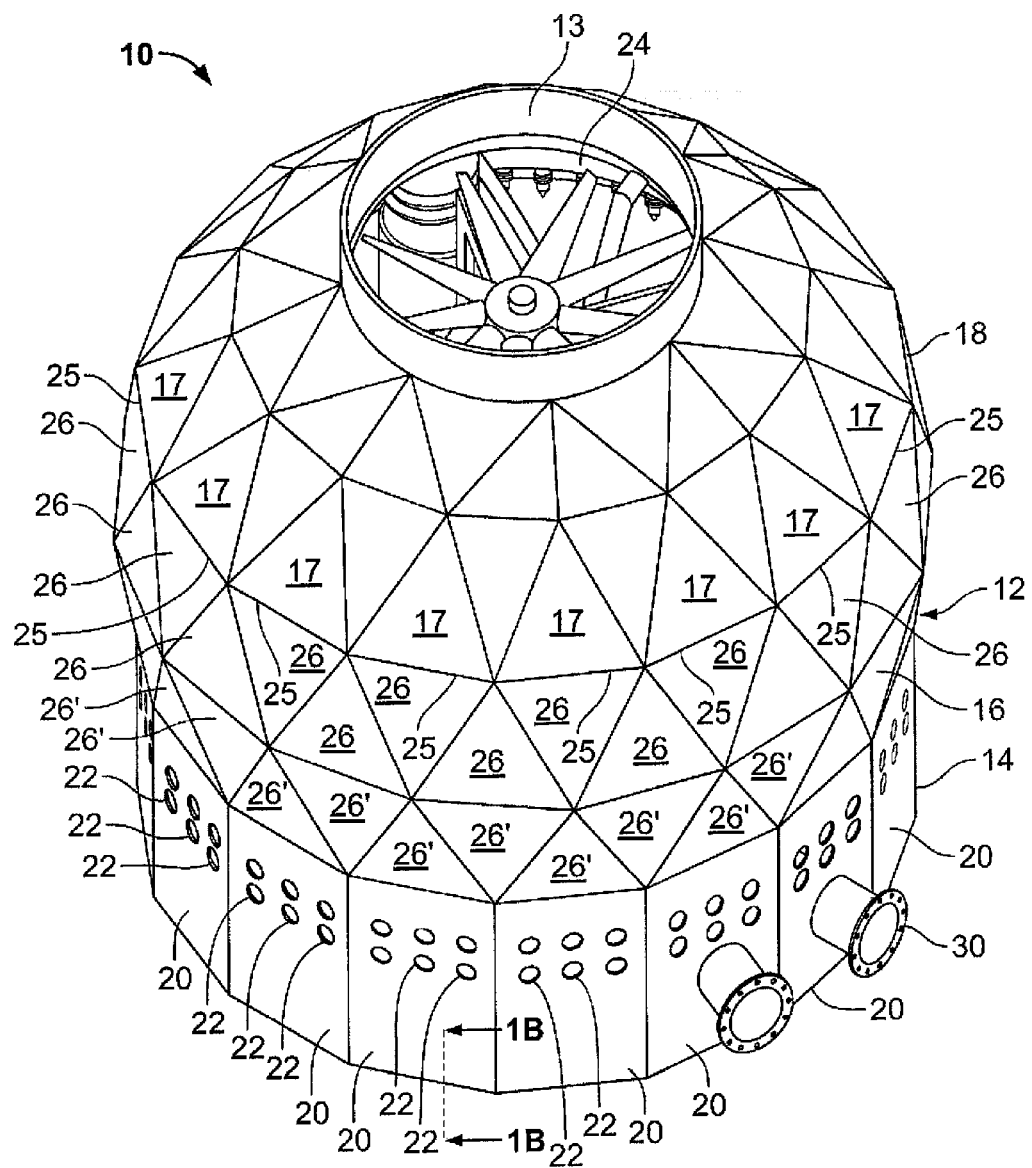
FIG. 1A depicts a perspective view of the exterior of a cooling tower according to the first embodiment of the present invention.

FIG. 1A depicts the exterior appearance of a cooling tower 10 according to a first embodiment of the present invention. Cooling tower 10 includes an exterior shell 12. Exterior shell 12 includes a base section 14, a cap section 18, an annular wall 16 residing between base section 14 and cap section 18. Annular wall 16 supports cap section 18 and is supported on base section 14.

Base section 14 preferably includes a polygonal enclosure defined by a plurality of rectangular, planar panels 20. Preferably, panels 20 have the same shape and the same dimensions, and are joined along edges thereof to obtain a wall with a uniform height along its upper edge. A plurality of openings 22 are defined in panels 20 to allow air to pass from the exterior of shell 12 to the interior space thereof. In operation, openings 22 serve as air in-take passages.

Figure 1B:
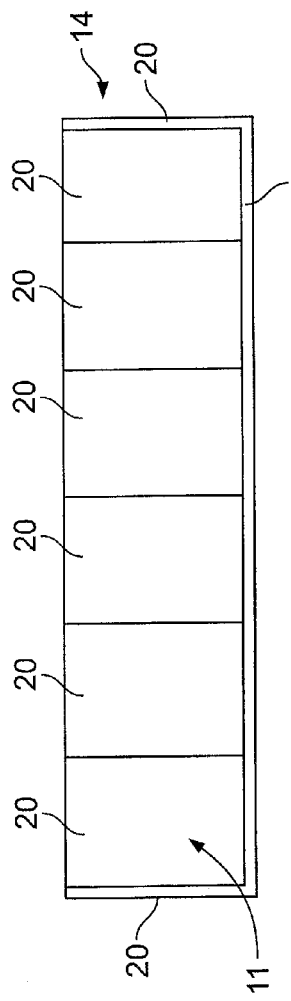
FIG. 1B depicts a cross-sectional view of the base section of the shell of the cooling tower shown in FIG. 1A along vertical plane 1B-1B, viewed in the direction of the arrows.

Base section 14 may be joined to a bottom wall 15 to define a water-tight pool 11 that collects cooled water (see FIG. 1B) below openings 22. Alternatively, a pool or another type of water-tight reservoir may be provided within base section 14.

Cap section 18 is preferably dome shaped and includes an air passage 24 defined at the apex thereof with an edge surrounding the central axis of cap section 18. Air passage 24 allows air to pass out of shell 12. A cylindrical ring 13 or the like may be provided to surround air passage 24 and serve as a flue. In operation, air passage 24 serves as an air exit passage for the passage of heated air.

Cap section 18, may have any suitable structure. In the embodiment illustrated, cap section 18 is a geodesic dome that is made by joining a plurality of panels (e.g. triangular panels) with a portion adjacent the apex thereof removed to define air passage 24.

Figure 1C:
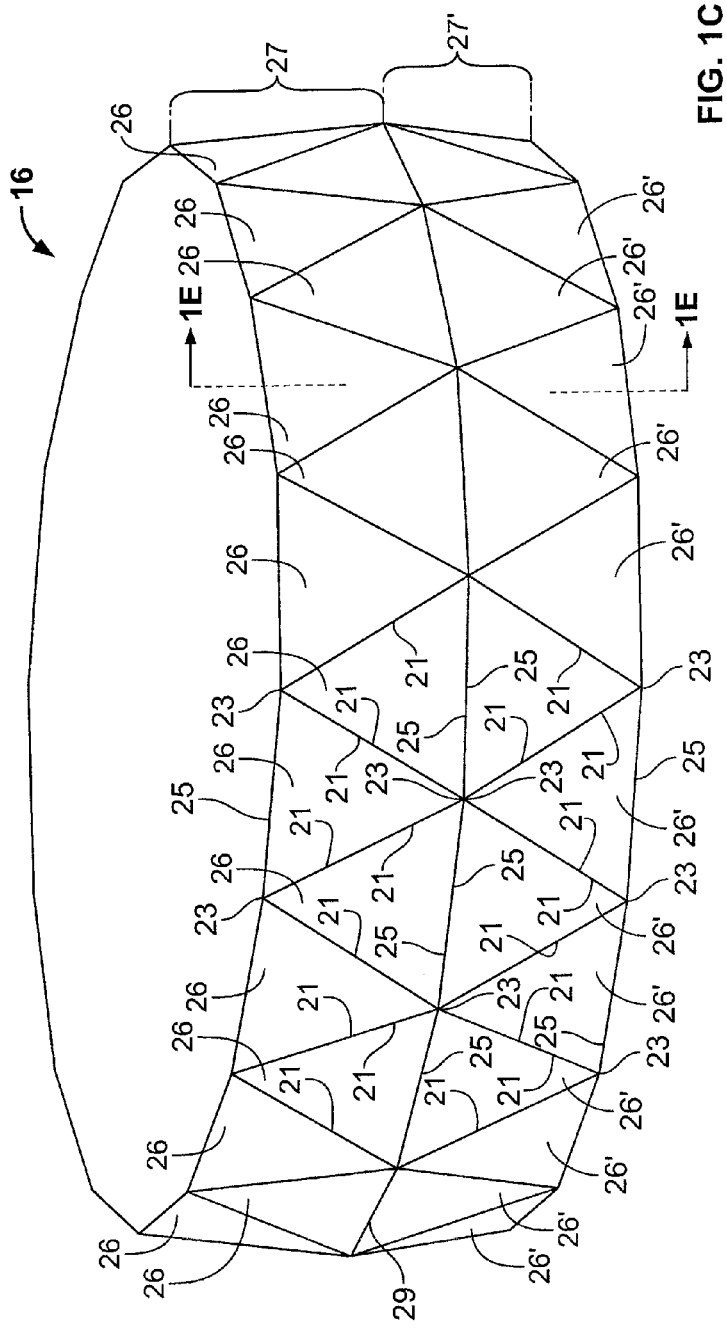
FIG. 1C depicts a perspective view of the annular wall of the shell of a cooling tower according to the first embodiment of the present invention.

Referring to FIG. 1C, annular wall 16 is constructed with a plurality of triangular planar panels 26,26'. Each triangular panel 26, 26' includes two sides 21 connected at an apex point 23 and a base 25, which, as used herein, means the side that extends between the ends of the two sides opposite the apex point. Triangular panels 26,26' are arranged in two groups. First triangular panels 26 (upper panels) are arranged closer to cap section 18 than the second triangular panels 26' (lower panels). First triangular panels 26 are adjacent one another and are integrated to form a first annular portion 27. Second triangular panels 26' are adjacent one another and are integrated to form a second annular portion 27'. Thus, each annular portion includes a plurality of adjacent triangular panels arranged side by side so that the apex of each panel is adjacent the bases of two adjacently positioned panels. First annular portion 27 and second annular portion 27' are preferably symmetric structures, and each resides at a respective side of a symmetry line 29.

First annular portion 27 is defined by joining each first panel 26 with two other adjacent first panels 26. Specifically, a side 21 of each first triangular panel 26 is joined to a respective side 21 of another adjacent first triangular panel 26 while its base 25 is joined to one of cap section 18, and second annular portion 27'.

Also, to define second annular portion 27' a side 21 of each second triangular panel 26' is joined to a side 21 of another, adjacently positioned second triangular panel 26', while its base 25 is either joined to base section 14 or first annular portion 27.

In the preferred embodiment, bases 25 of first panels 26 and bases 25 of second panels 26' are joined to one another, when not joined to cap section 18 or base section 14. Preferably, bases 25 of first panels 26 and second panels 26' are oriented parallel to one another.

Preferably, all panels 26,26' have the same shape and dimensions, have a uniform thickness, and the joint between the joined sides 21 of two first panels 26 or two second panels 26' is coextensive with the joined sides, and the joint between the joined bases 25 of a joined first panel 26 and a second panel 26' is coextensive with the joined bases 25 thereof. It should be noted that in the preferred embodiment, symmetry line 29 coincides with the joint between first annular portion 27 and second annular portion 27'.

Figure 1D:
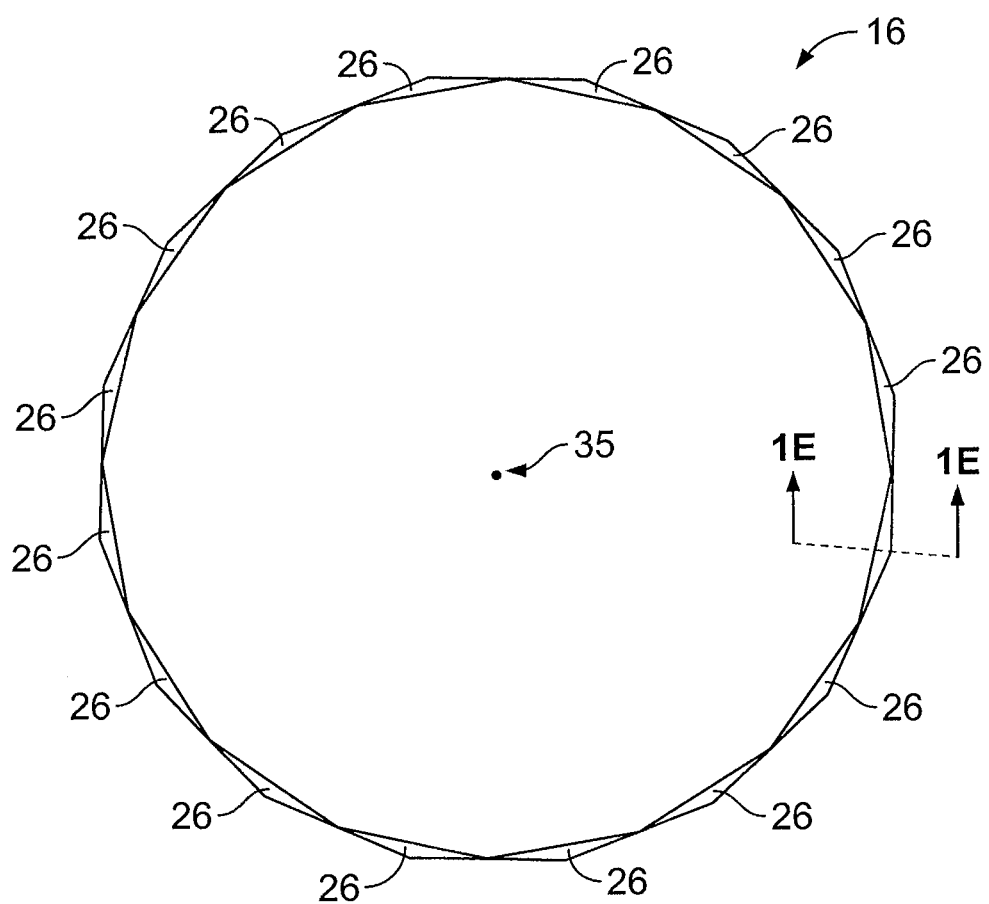
FIG. 1D depicts a top plan view of the annular wall section of the shell of a cooling tower according to the first embodiment of the present invention.
Figure 1E:
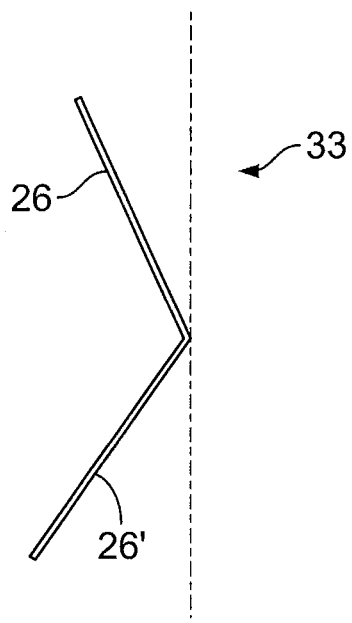
FIG. 1E depicts a cross-section view of a portion of the annular wall shown in FIG. 1D (see also FIGS. 1C and 1F) taken along line 1E-1E, viewed in the direction of the arrow shown.
Figure 1F:
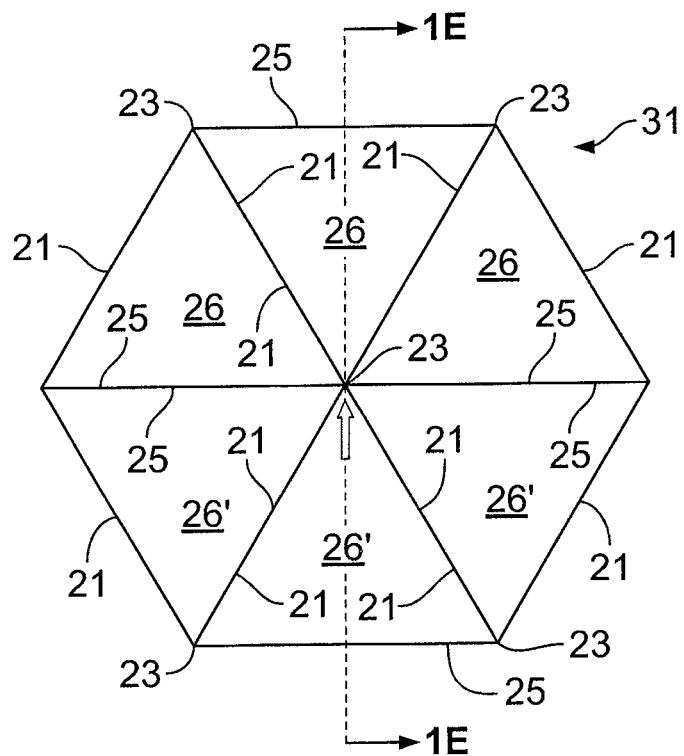
FIG. 1F illustrates a geodesign element in the annular wall.

In first annular portion 27, each first panel 26 is oriented at an angle relative to a vertical plane 33 that is more than zero and each second panel 26' is oriented at an angle relative to a vertical plane 33 that is more than zero when central axis 35 of annular wall 16 is vertical, as illustrated in FIGS. 1D and 1E. The result is an annular wall that includes bulging sections that bulge outwardly (i.e. away from the central axis of annular wall 16). An example of a bulging section 31 is illustrated in FIG. 1F.

In the first embodiment, bases 25 of first panels 26 that are joined with cap section 18 are joined to, and may be coextensive with, respective sides of the lowest triangles 17 in the geodesic dome elements in cap section 18.

In the first embodiment, bases 25 of second panels 26' that are joined with base section 14, may be joined to and may be coextensive with respective upper edges of rectangular panels 20 in base section 14.

Panels 20,26,26' and the panels that define cap section 18 may be planar sheets of metal (e.g. aluminum or stainless steel) joined to one another by welding or any other suitable method.

A shell 12 according to the present invention may be self-supporting, so that it does not require an internal framework for structural support.

Figure 2:
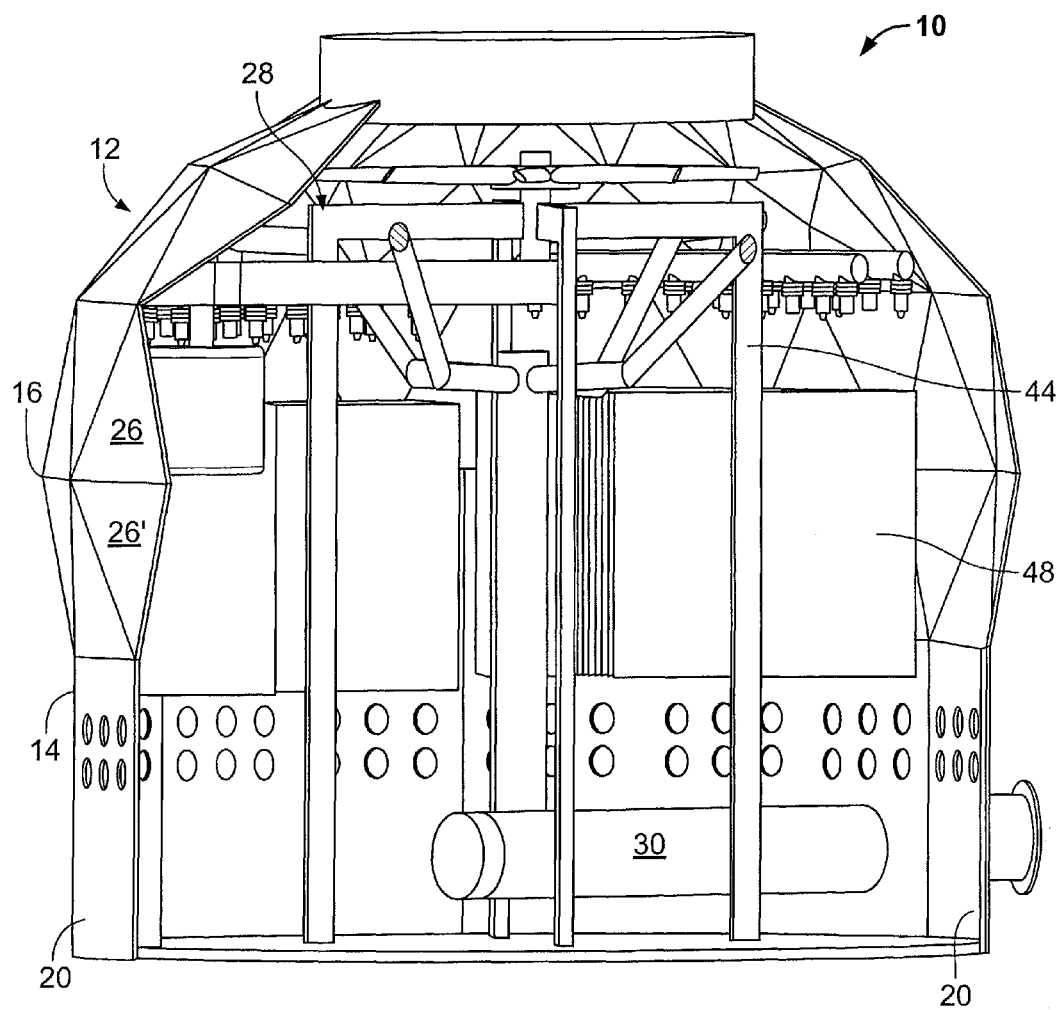
FIG. 2 depicts a side plan view of a cooling tower according to the first embodiment of the present invention with a portion of the shell thereof removed from view to show its interior.

Referring to FIG. 2, shell 12 in tower 10 defines an interior space 28. A cooling apparatus resides within shell 12.

Figure 3A:
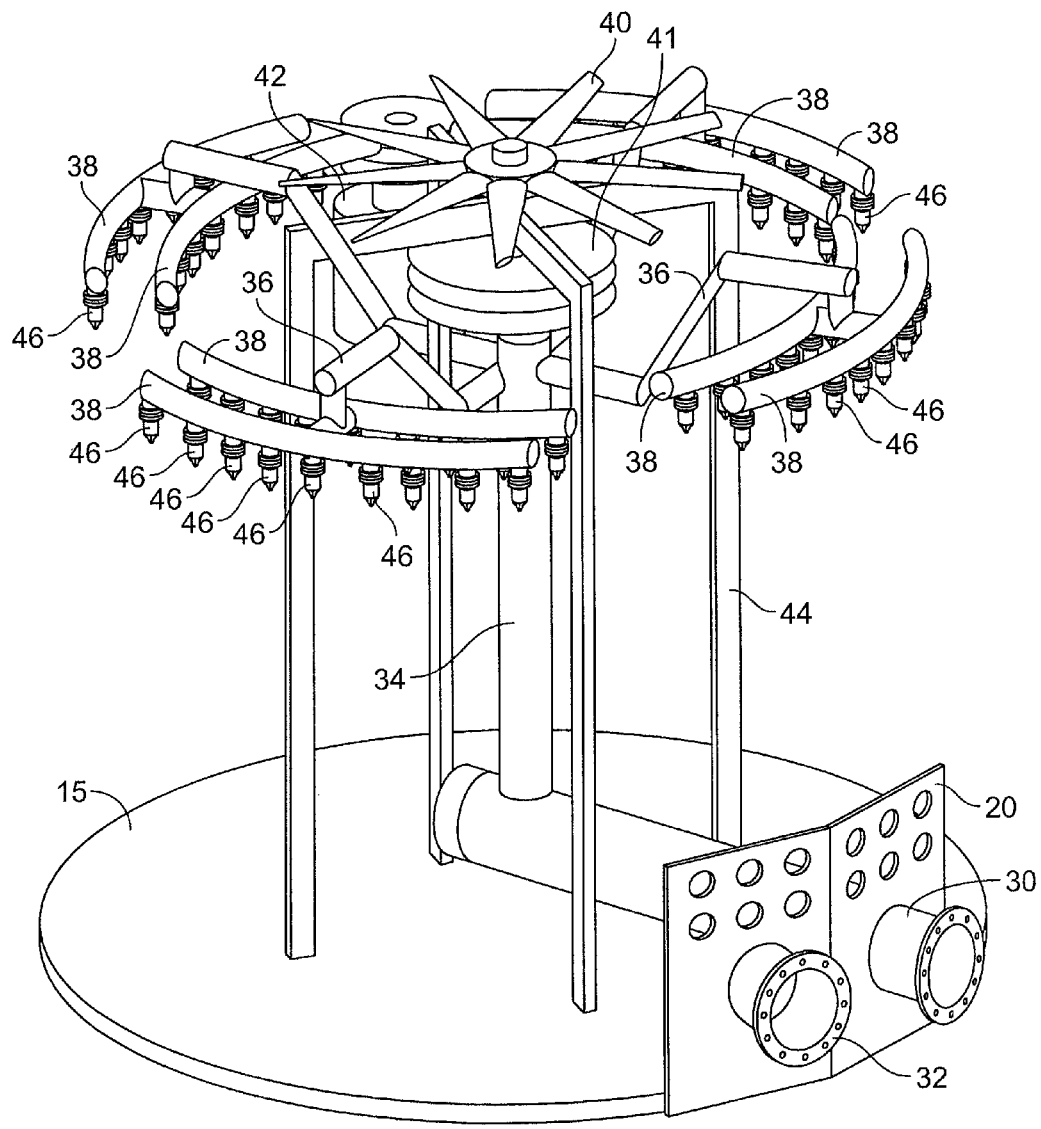
FIGS. 3A, 3B, and 3C depict the cooling apparatus residing in a cooling tower according to the first embodiment of the present invention.
Figure 3B:
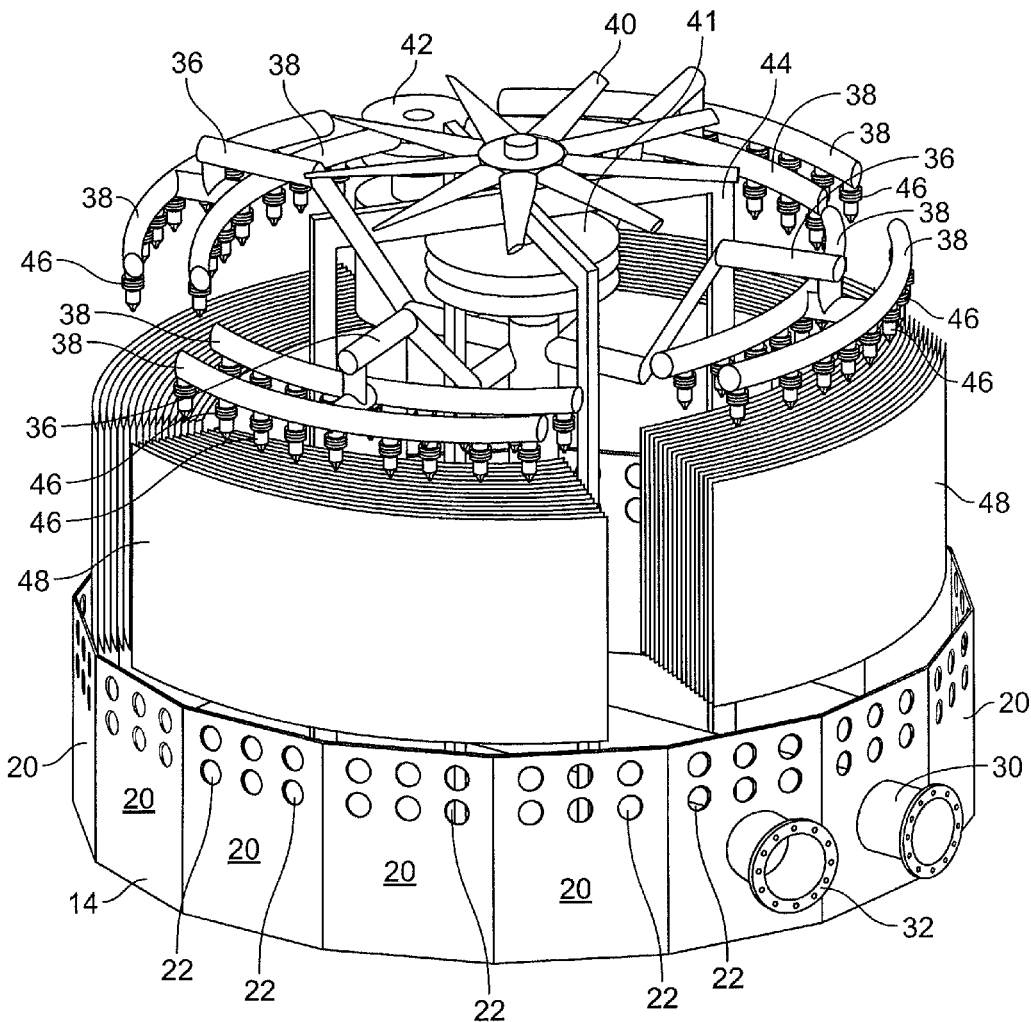
Figure 3C:
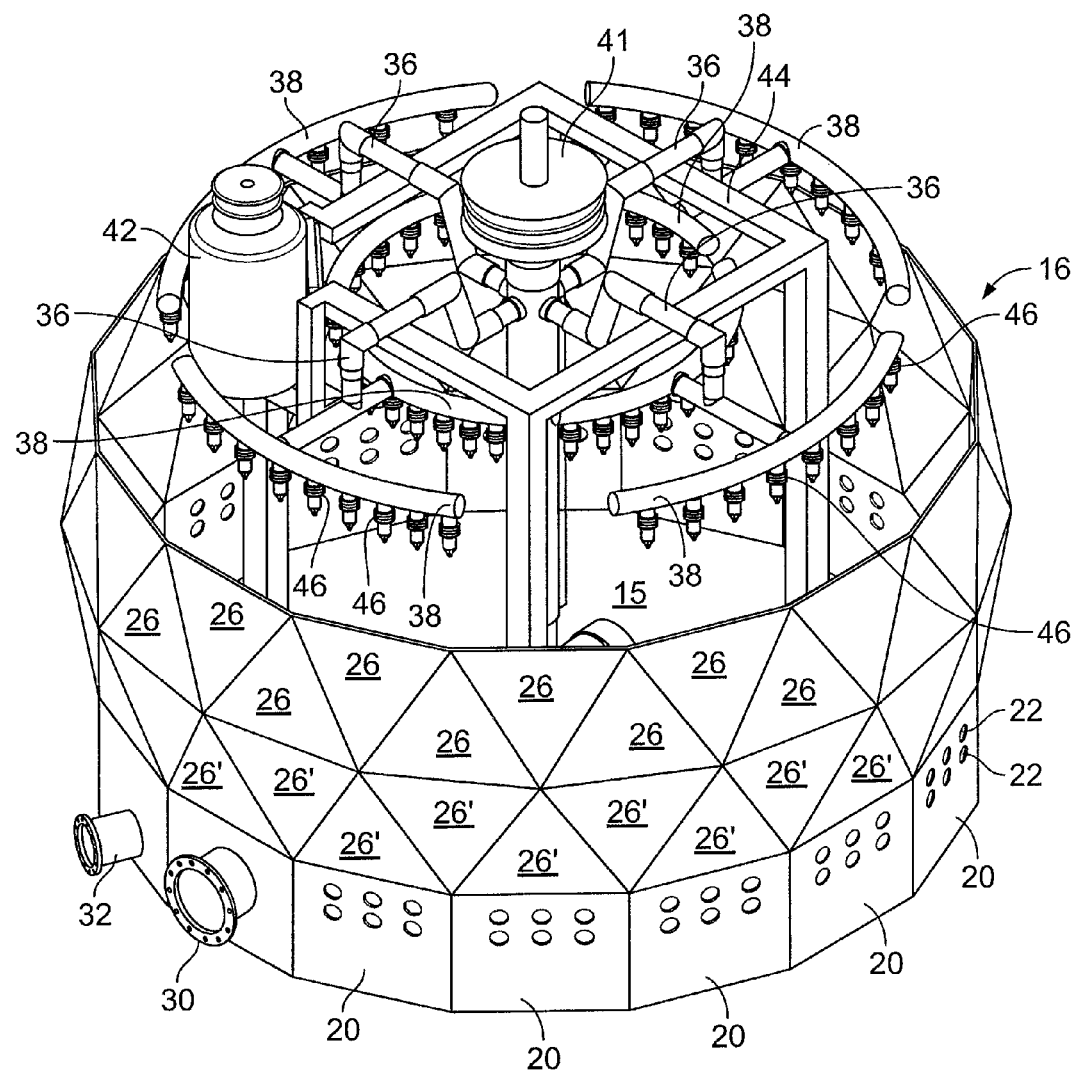

Referring to FIGS. 3A-3C, the cooling apparatus includes an inlet pipe 30, an outlet pipe 32 which is in communication with pool 11 (FIG. 1B) defined by base section 14 and bottom wall 15, a riser pipe 34 connected to inlet pipe 30, a plurality of primary distribution pipes 36 connected to riser pipe 34 for receiving water from riser pipe 30, a plurality of secondary distribution pipes 38 each connected to a respective primary distribution pipe 36 to receive water, a fan 40, a motor 42 may be connected with a belt to a pulley 41 which is coupled to fan 40 to rotate fan 40, an internal frame support 44 extending upwardly from bottom wall 15 and supporting fan 40 and motor 42 below air passage 24 (see FIG. 1A), and a plurality of fill cells 48 residing above bottom wall 15 and below secondary distribution pipes 38. Motor 42 may be bolted to frame 44. Fill cells 48 are also supported by frame 44 under nozzles 46 and surrounding an interior space directly below propeller 40. While supports for fill cells 48 are not shown, it should be noted that fill cells 48 may be supported by any suitable support. Further, according to the preferred embodiments fill cells 48 may be arcuate, whereby more surface area per volume may be provided compared to a conventional, cubical cooling tower.

Preferably, secondary distribution pipes 38 are arcuate, are capped at the terminal ends thereof, and are arranged along two concentric circles.

Preferably, a pair of secondary distribution pipes 38 receives water from one primary distribution pipe 36. Each secondary distribution pipe 38 is configured to deliver water into interior space 28 of shell 12. Thus, secondary distribution pipes 38 may be perforated in order to deliver water into interior space 28 of shell 12. Spray nozzles 46 may be mounted to secondary distribution pipes 38 in communication with the perforations therein to receive water from secondary distribution pipes 38 and spray the water so received into interior space 28. Fill cells 48 (shown in FIG. 2) may be provided below secondary distribution pipes 38 to receive the water that is delivered into interior space 28 during operation.

In operation, water at one temperature is delivered into interior space 28 via inlet pipe 30 and cooled. Water that is delivered to and cooled in interior space 28 of shell 12 collects in pool 11 (see FIG. 1B) at the bottom of tower 10 and leaves interior space 28 through outlet pipe 32.

To cool the water, while water is sprayed over fill cells 48, air is continuously taken into interior space 28 via openings 22, and pulled against fill cells 28 by the operation of motor 42 and fan 40, which creates a draft in interior space 28. As a result of the operation, the air in interior space 28 is heated. The heated air is expelled from interior space 28 by fan or impeller 40, which is arranged directly below air passage 24 (see FIG. 1A). The expelled air is replaced with air received through openings 22 in panels 20 defined in base section 14.

Figure 4:
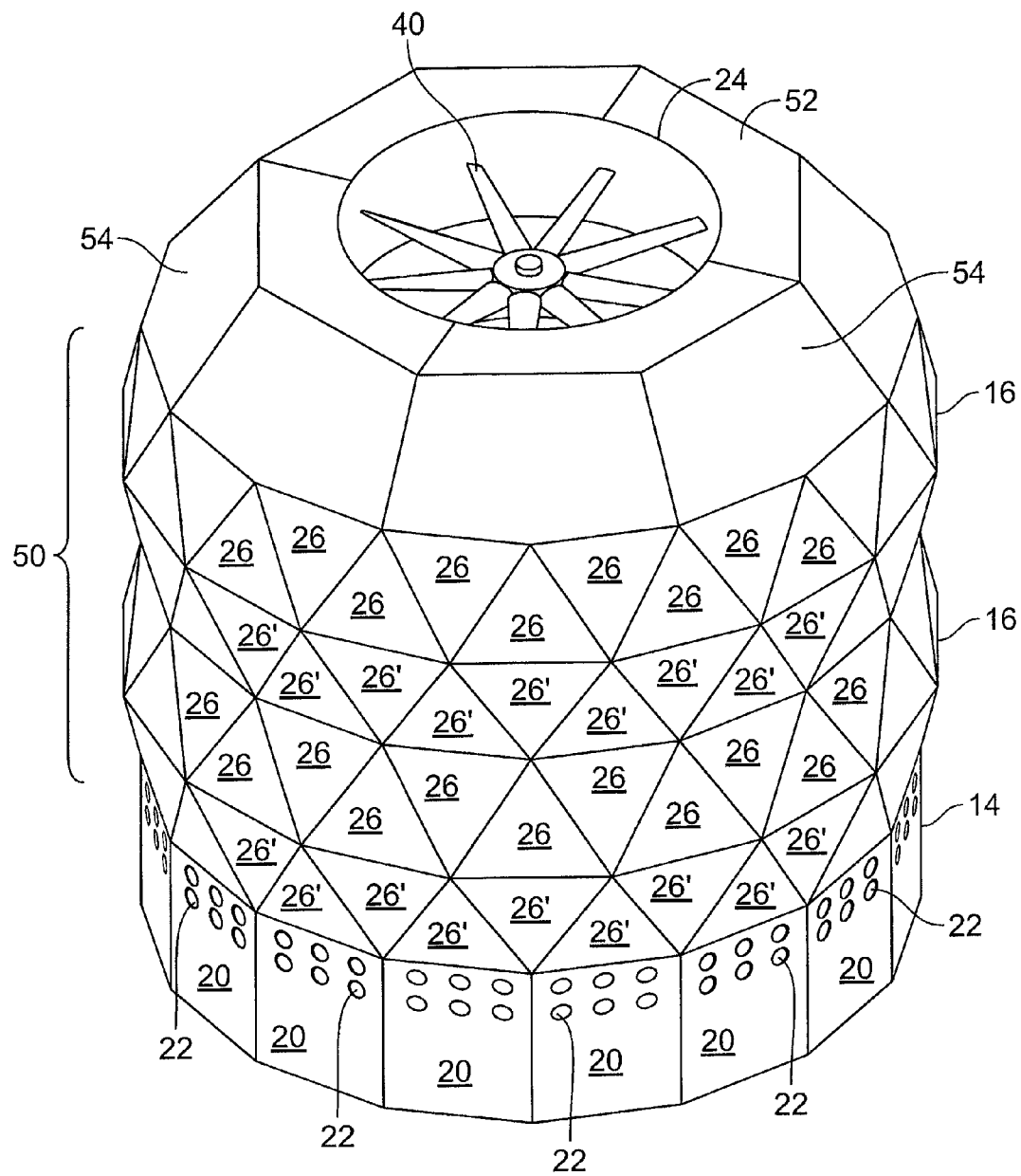
FIG. 4 depicts the exterior appearance of a cooling tower according to the second embodiment of the present invention.

Referring to FIG. 4, a cooling tower according to the second embodiment of the present interior has a shell 50. Shell 50 includes two annular walls 16 one stacked atop the other, and both residing between cap section 18 and base section 14, to increase the height of the cooling tower without increasing its footprint. Each annular wall 16 is constructed in the same manner as annular wall 16 in the first embodiment. In this embodiment, cap section 18 may be a geodesic dome, or may be a structure that includes a flat polygonal top 52 in which an air passage 24 is defined, and an annular, sloping wall 54 that includes a plurality of panels, which tilt inwardly toward the central axis of cap section 18 between the uppermost annular wall 16 and top 52.

A shell 12 or 50 according to the present invention minimizes or eliminates the hot corners present, for example, in a cooling tower with a cubical outer shell. Moreover, air will move in a continuous circular path through fill cells 48 instead of being propelled against flat walls as is the case in a cubical shell. Thus, the impeding forces that impede air movement inside a shell of a conventional cubical shell may be reduced, whereby the efficiency of the system may be improved as less power will be required to achieve the same work.

Figure 5:
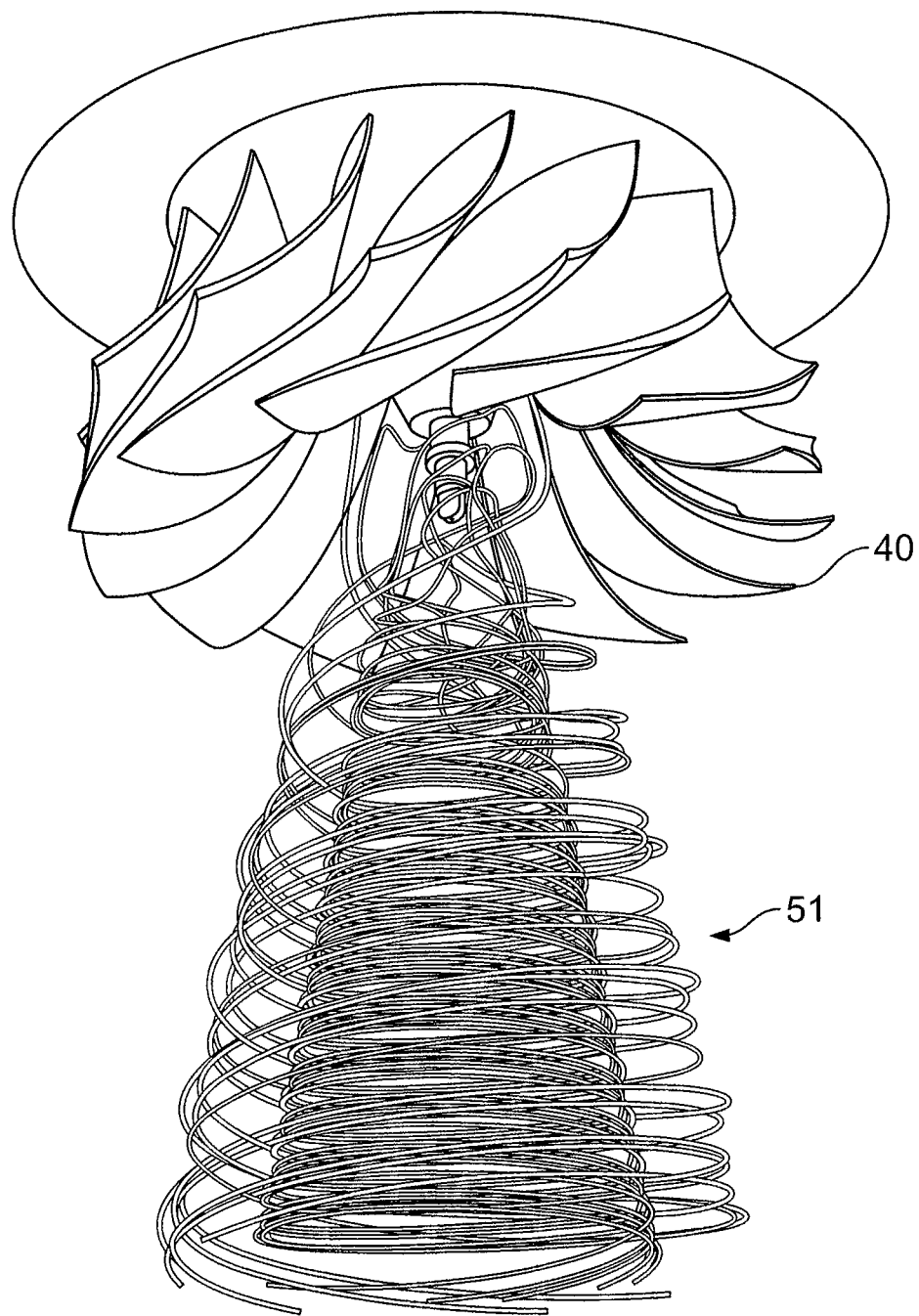
FIG. 5 illustrates an air vortex that can be generated inside a cooling tower according to the present invention.

Moreover, referring to FIG. 5, an air vortex 51 may be generated with the rotation of impeller 40 inside of a shell 12, 50 according to the present invention. The vertical flow of air inside of a cooling tower according to the present invention causes more air to pass along wet fill cells 48 per unit of time compared to, for example, cubical cooling towers. Thus, the generation of the air vortex results in a more efficient heat exchange within interior space 28 thereby increasing the efficiency of a cooling tower constructed according to the present invention. Specifically, a tower design according to the present invention may cause the condensation of water which partially cools the water before the water reaches the sprinkler system, thereby adding to the efficiency of the cooling process.

Exterior shell 12 may be made with panels of galvanized aluminum, galvanized steel, or stainless steel.

Figure 6:
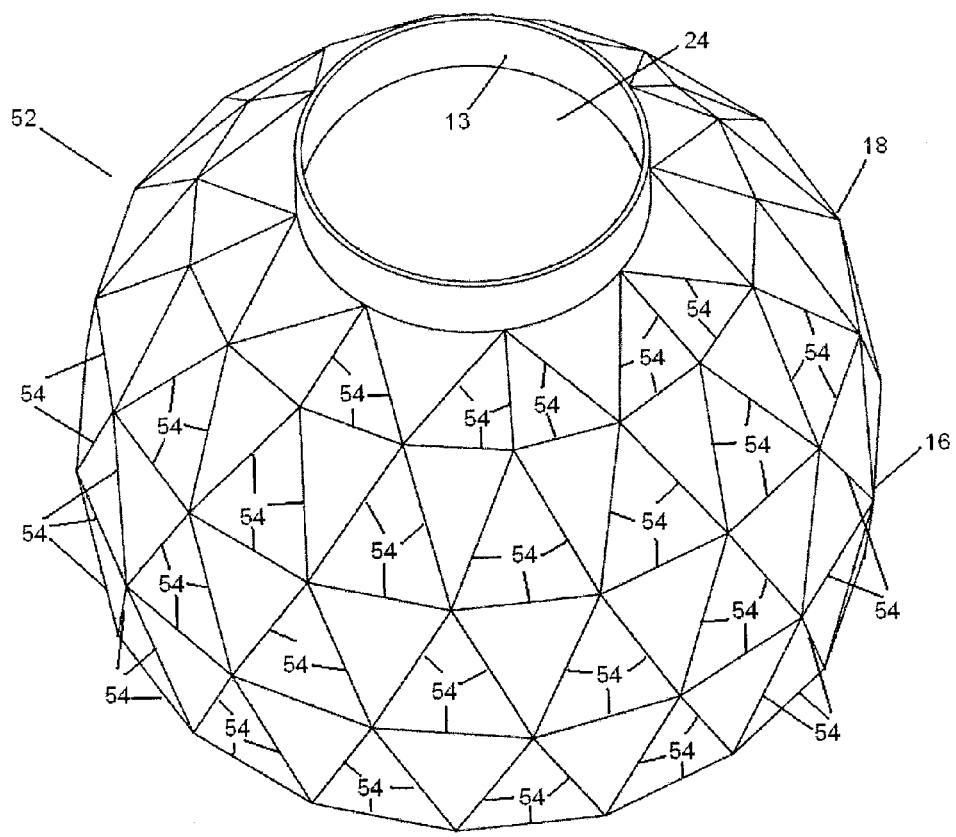
FIG. 6 illustrates the exterior appearance of a cooling tower support for a cooling tower according to the third embodiment of the present invention.

According to another embodiment, an exterior shell may be constructed with an open frame work for a geodesic structure according to the embodiments disclosed herein which is then covered with a thermal sheet (like a tent) to create the appearance of a geodesic exterior shell in order to further reduce the weight of the exterior shell. Referring to FIG. 6, an open frame work 52 may include a plurality of beams 54 interconnected to obtain support for annular wall 16 and cap 18. Open frame work 52 may be then covered with a thermal cover. In this embodiment, each planar panel would be replaced with an open triangle realized with three connected beams 54 and a portion of the thermal cover.

An apparatus according to the present invention may include a cooling coil in the base section for further cooling of the water.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A cooling tower, comprising:
   a shell having a base section, a cap section, and an annular wall residing over the base section and below the cap section to support the cap section and to define an interior space, the annular wall including a plurality of geometric bodies joined to one another to define a structure in which the geometric bodies are oriented at an angle that is more than zero relative to a vertical plane, and the cap section including an air passage; and
   a cooling apparatus residing in the interior space.

2. The cooling tower of claim 1, further comprising an outlet from the air passage;
   the cooling apparatus includes a fan arranged opposite the air passage and operated to expel air from the interior space.

3. The cooling tower of claim 2, further comprising wherein the fan is operated by a motor which is supported by a frame residing within the interior space.

4. The cooling tower of claim 3, wherein the cooling apparatus includes a network of pipes, the network of pipes including an inlet pipe for liquid, a riser connected to the inlet pipe, a plurality of primary distribution pipes connected to the riser at locations spaced from the inlet pipe, and a plurality of secondary distribution pipes, each distribution pipe arranged around the frame and configured to deliver liquid to the interior space.

5. The cooling tower of claim 4, wherein the secondary distribution pipes are arcuate to extend inside the annular wall.

6. The cooling tower of claim 5, wherein a pair of the secondary distribution pipes is connected to one of the primary distribution pipes.

7. The cooling tower of claim 4, wherein the cooling apparatus further comprises a plurality of fill cells in the interior space and positioned to receive water from the secondary distribution pipes.

8. The cooling tower of claim 7, further comprising air intake openings defined in the shell below the secondary distribution pipes.

9. The cooling tower of claim 8, wherein the air intake openings are defined in the base section.

10. The cooling tower of claim 8, wherein the base section includes an annular wall and a bottom wall that define a water-tight reservoir positioned below the fill cells to receive cooled water.

11. The cooling tower of claim 1, wherein the geometric bodies are triangular panels.

12. The cooling tower of claim 11, wherein each triangular panel includes two sides and a base, each side of each triangular panel being joined with a respective side of an adjacently disposed triangular panel, and the base of each triangular panel extending toward or being joined with either the base section or the cap section.

13. The cooling tower of claim 11, wherein the annular wall includes two annular portions, each annular portion including a plurality of triangular panels with two sides and a base, each side in each triangular panel being joined with a respective side of an adjacently disposed triangular panel, and each base of each triangular panel in each annular portion being joined with one of the base section, the cap section, and a base of another triangular panel in the other of the two annular portions.

14. The cooling tower of claim 13, wherein the annular portions are joined at a plane of symmetry residing between the two annular portions.

15. The cooling tower of claim 1, wherein the shell further comprises another annular wall stacked atop the annular wall, the other annular wall including a plurality of geometric bodies joined to define a structure in which the geometric bodies are oriented at an angle that is more than zero relative to a vertical plane.

16. The cooling tower of claim 1, wherein the cap section is a dome.

17. The cooling tower of claim 1, wherein the shell is configured to be self-supported.

18. The cooling tower of claim 1, wherein each geometric body is comprised of a plurality of interconnected beams configured to together define a shape of the geometric body and a covering over the beams thereof.

* * * * *